United States Patent [19]

Shadbolt et al.

[11] 4,177,309

[45] Dec. 4, 1979

[54] DRY TRANSFER MATERIALS

[75] Inventors: Philip Shadbolt; Helen Ganszczyk, both of London, England

[73] Assignee: Letraset USA Inc., Bergenfield, N.J.

[21] Appl. No.: 845,608

[22] Filed: Oct. 26, 1977

[30] Foreign Application Priority Data

Nov. 5, 1976 [GB] United Kingdom .............. 46262/76

[51] Int. Cl.[2] .............................................. B32B 7/14

[52] U.S. Cl. .................................... 428/195; 156/230; 156/240; 427/147; 428/201; 428/204; 428/205; 428/207; 428/914

[58] Field of Search ............... 428/195, 204, 206, 201, 428/205, 343, 914; 156/230, 240; 427/147

[56] References Cited

U.S. PATENT DOCUMENTS

| | | | |
|---|---|---|---|
| 3,987,225 | 10/1976 | Reed et al. | 428/195 X |
| 4,028,165 | 6/1977 | Rosenfeld | 428/204 X |
| 4,028,474 | 6/1977 | Martin | 428/204 X |
| 4,041,194 | 8/1977 | Jenkins | 428/204 X |
| 4,044,181 | 8/1977 | Edhlund | 428/195 X |
| 4,066,810 | 1/1978 | Kosaka et al. | 428/195 |

FOREIGN PATENT DOCUMENTS 589276 12/1959 Canada .

*Primary Examiner*—Thomas J. Herbert, Jr.
*Attorney, Agent, or Firm*—Darby & Darby

[57] ABSTRACT

Dry transfer materials, e.g. dry transfer lettering sheets, are made from a transparent or translucent carrier sheet indicia thereon (e.g. in printing ink or produced photographically) and a layer of adhesive over the indicia and on the carrier sheet in the areas between the indicia. By incorporating a suitable amount of a detackifying polar wax in the adhesive, when the adhesive is deposited from a solution and/or dispersion in an organic solvent, the adhesive dries down to be stickier over the indicia than in the areas where it is directly on the carrier sheet.

13 Claims, No Drawings

DRY TRANSFER MATERIALS

This invention relates to dry transfer materials.

In the manufacture of dry transfer materials, particularly in the manufacture of dry transfer lettering sheets e.g. of the types described in British Pat. Nos. 906934 and 959670 great care must be taken in formulating the particular adhesive used. The adhesive must act adequately to secure the transferable image to the desired receptor surface, but at the same time it must not be of such a character that adhesive is transferred from areas outside the images on to the surface of the receptor. Such extra adhesive, referred to simply as contamination, is disadvantageous since it attracts dirt and dust to the surface of the receptor rendering it unsightly. The specifications noted above teach how adhesives may be formulated so as to be sufficiently cohesive to remain on the carrier sheet of the dry transfer material in the areas between the indicia but still be just sufficiently adhesive to enable the indicia to be transferred. Some such compromises are difficult to effect in practice, and the constraints on adhesive formulation thereby given act adversely to the production of satisfactory adhesives.

British Pat. No. 954459 describes a process of manufacturing dry transfer lettering sheets which avoids the problem. In that specification a method of manufacture is described in which an adhesive is laid down on the transfer material from a solvent which attacks the carrier sheet. In the area between the indicia this attack causes a physicochemical reaction to take place the result being a non-tacky surface after the solvent has been evaporated. Over the indicia, however, no such reaction takes place and the adhesive is simply dried down to leave a tacky adhesive layer.

The only commercially practical way of putting the invention described in specification No. 954459 into effect has been to select as carrier sheet a styrene butadiene copolymer film, preferably a highly oriented film of a styrene butadiene copolymer. Such materials are expensive and give rise to other technical disadvantages, notably sheet curl. It is possible to design systems which work on the same principle using other carrier sheets but they are generally impractical.

We have now found that a difference in adhesiveness between an adhesive applied over the indicia and adhesive applied to the spaces between the indicia may be achieved if care is taken in formulating the adhesive and if the adhesive is deposited from a solvent and contains, at an appropriate concentration, an appropriate type of wax.

According to a first feature of the present invention there is provided a dry transfer material comprising a flexible transparent or translucent carrier sheet, a plurality of transferable indicia on the carrier sheet and a coating of adhesive substance on the indicia and overlapping on to the surface of the carrier sheet, the adhesive coating containing dry transfer adhesive components and additionally containing a detackifying wax containing polar groups, the concentration of the wax being such that on deposition of the adhesive composition from solution or dispersion in at least one organic solvent and drying down of the adhesive by the evaporation thereof an interaction takes place between the adhesive and the indicia having as its result that the tack level of the adhesive layer over the indicia is greater than the tack level of the adhesive on the carrier between the indicia.

Although the exact mechanism whereby the difference in tack level is achieved is not fully understood, it clearly derives from a difference in the interaction between the adhesive applied on the one hand and the surface to which the adhesive is applied on the other. The surface of the indicia on the flexible carrier sheet is generally of a different nature from the carrier sheet itself, and in general the indicia have a relatively highly polar surface compared with that of the carrier film. Thus, in the case of indicia printed from a printing ink, particularly from a nitrocellulose based ink, those indicia will have a highly polar surface while the surface of most transparent or translucent plastics films is relatively non-polar, and in the case of certain films such as polypropylene and polyethylene films is very non-polar indeed. It is believed that when an adhesive containing a polar wax at an appropriate concentration is applied to the surface of the carrier material carrying indicia, there is a tendency for the polar groups in the wax molecules to interact with the material of the indicia and so increase the concentration of wax in the adhesive layer adjacent the indicia, i.e. depleting the wax concentration on the exposed adhesive surface, which tendency is absent in the case of the relatively non-polar surface between the indicia. Because the action of the polar wax is a detackifying action, i.e. the polar wax is one which when added to a conventional dry transfer adhesive lowers the tack level thereof, that tack level is lowered in the areas between the indicia where the polar wax may be evenly distributed throughout the adhesive. Over the indicia, it is believed, the presence of the indicia causes the polar wax to be very unevenly distributed i.e. to be concentrated adjacent the indicium. The remainder of the adhesive is accordingly relatively depleted of the detackifying polar wax i.e. is relatively tackier.

While care needs to be taken in selection of particular materials and concentrations for use in the adhesive, it is found that a very wide variety of materials may be used and substantial variations effected while still obtaining a difference in tack level when the adhesive is coated on to the carrier sheet bearing indicia.

It is found that the difference in tack level is more marked, for a given indicia material, the less polar the carrier sheet surface. Likewise, for a given carrier sheet, the more polar the material of the indicia, the greater the tack difference.

The transfer materials of the present invention present a number of advantages stemming from the difference in tack between the areas over the indicia and the areas between the indicia. The risk of "pick back" during use, when a previously transferred indicium is picked off the receptor by adhesive on the sheet during its subsequent use, is much reduced. The overall tack level of the sheet may be lowered, thus improving the ease of handling the transfer material. Alternatively, for certain areas of use, the tack of the adhesive on the indicia may be increased while still maintaining reasonably satisfactory handleability.

The present invention is applicable to transfer materials based on a very wide range of ink and adhesive systems, and broadens the ranges of materials usable to make dry transfer lettering sheets. However, these advantages are obtained without the necessity of introducing further steps in the manufacture of the product which may still be made on existing equipment by the customary printing, drying and adhesing (by printing or coating) steps.

The various components of the dry transfer material will now be considered individually:

First of all, the carrier sheet should be a transparent or translucent film. Films of polyethylene, polypropylene, polystyrene, polystyrene/butadiene, polyvinyl chloride and polyethylene terephthalate are all suitable. The film may be used as such or it may carry a release coating on the surface on which the indicia are located. The carrier sheet should preferably have a thickness of between 0.025 and 0.15 mm.

The indicia may be produced either by printing or by photographic methods such as those disclosed in British Pat. Nos. 1,079,661, 1,291,960 and 1,364,627. A very wide variety of printing ink formulations may be used, e.g. printing lacquers based on a cellulose polymer such as on nitrocellulose or hydroxyethyl cellulose. Polyurethane and epoxy based inks may also be used as well as polyamide based inks, alkyd based inks, inks based on vinyl polymers and copolymers, for example vinyl chloride/vinyl acetate copolymer based inks and inks based on acrylic polymers such as ethyl and methyl methacrylates. All of these printing inks can be formulated to be printable by a variety of printing techniques though most commonly screen process printing is used since this enables the rapid production of a solid ink film having adequate film strength to enable it to be transferred as a complete unit from the dry transfer material.

Whether produced by printing or by photographic methods the indicia may be of a kind removable from the carrier sheet solely by the pulling power of the subsequently applied adhesive, or use may be made of the so-called stretch release technique described in British Pat. No. 959670. In that technique, the relative physical properties, particularly the extensibilities of the material of the indicia and of the carrier sheet are so chosen that on local stretching of the carrier sheet consequent on the application of localised pressure to the back of the dry transfer material, the bond between the carrier sheet and the indicium is weakened or broken, thus leaving only a residual bond to be overcome by the pulling power of the applied adhesive.

The adhesive composition consists of a dry transfer adhesive composition which may be of known type together with a minor proportion of a detackifying polar wax.

The basic dry transfer adhesive constituting the major proportion of the adhesive according to the present invention may consist of only one component, e.g. an adhesive wax, but preferably consists of a relatively tacky component together with one or more detackifying components. Relatively tacky components which may be used are a wide variety of tacky polymeric materials which are either intrinsically tacky or which are used together with tack promoting agents to render them tacky. Tack reducing agents which are used therewith include waxes and finely divided mineral materials. Examples of suitable tacky polymeric materials include polybutenes, polyisobutylene, polyvinyl ethers and various acrylic polymers such as poly(2-ethylhexylacrylate).

Examples of suitable waxy tack reducing components which may be employed are natural or synthetic hydrocarbon waxes and other generally non-polar waxes. The preferred finely divided mineral material for detackifying is finely divided silica.

The polar wax used in the adhesive must have a detackifying effect on the adhesive but, apart from this condition, may be selected from a very wide variety of polar waxes. Both natural and synthetic materials may be used and the following are examples: polyethylene glycol waxes; cetyl alcohol; lanoline alcohols, long chain fatty acids such as stearic and palmitic acids; long chain primary, secondary and tertiary amides such as stearamides and oleamides; and amines such as octadecylamine and hexadecylamine; heterocyclic waxes such as oxazoline waxes; waxy alkylamides; glycerol ester waxes and long chain quaternary ammonium waxy compounds. Materials such as alkali metal fatty acid salts may also be used. It should be observed that whether the polar wax will detackify the base dry transfer adhesive will depend upon the composition of that dry transfer adhesive itself and that certain polar waxes which will detackify some adhesives may enhance the tack of others. Simple experimental testing can be carried out to determine just what difference the addition of the polar wax makes, i.e. whether it is detackifying or not in the particular adhesive system in question, and thereafter to determine the optimum concentration to give the most enhanced difference in adhesiveness between indicia and non-indicia areas.

The proportions of the ingredients of the adhesive composition may vary widely. In terms of the solids content of the adhesive, it is found that the polar wax usually constitutes between 2 and 12% by weight of the adhesive.

In order to apply the adhesive over the indicia on the carrier sheet it is necessary to produce the adhesive in liquid or dispersed form. The adhesive should be dissolved or dispersed in one or more organic solvents to give a solution or dispersion of appropriate viscosity for application by the particular method chosen. The most convenient method of applying the adhesive is by screen printing over a rectangular area slightly smaller than the carrier sheet. However roller coating, bar coating or spray coating techniques may also be used. The solvent used to produce the solution or dispersed adhesive at the desired consistency for application is preferably a mixed solvent, most preferably consisting of a substantially non-polar organic solvent together with a proportion of a substantially polar organic solvent. The non-polar solvent is conveniently an aliphatic hydrocarbon solvent and the substantially polar solvent is preferably a polar solvent such as oxitol. The adhesive is preferably applied at a dry coating weight of 1 to 3 grams per square meter. The adhesive is preferably dried by hot air drying and it is found that the difference in tack between indicia and non-indicia areas is most pronounced when the heating is to a temperature greater than the "melting point" of the polar wax. The drying should be carried out for a sufficient period of time to evaporate substantially all of the solvent. Typical drying conditions are 35 to 40 seconds at 60° to 65° C.

It is believed that in the case of certain adhesive formulations there is a tendency during drying of the adhesive layer between the indicia, for the polar wax to concentrate at or near the surface of the adhesive layer remote from the carrier sheet. This further enhances the difference in tackiness between the surface of the adhesive over the indicia and the surface of the adhesive between them. The exact mechanism behind such a phenomenon is not fully understood though it may be analogous to the formation of a blush or bloom coating.

It is difficult to predict the degree of difference in tackiness which will be obtained using any particular combination of carrier sheet indicia material and any particular adhesive formulation. However, it is straightforward to carry out simple tests with a view to finding the optimum addition rate of the polar wax for any given set of circumstances. The most convenient approach is to manufacture a dry transfer material first of all using the desired carrier sheet indicium material and using the adhesive without the addition of the polar wax, adjusting the proportions of the ingredients in the adhesive to give a substantially non-tacky pressure sensitive adhesive layer, and then to add, in a series of tests, varying quantities of polar wax. The difference in tack of the adhesive layer between indicia and non indicia areas corresponds to differences in the peel bond of the adhesive layer to a standard surface, which can be easily measured e.g. using techniques of the type described in ASTM Specification D903-49 (reapproved 1965). The samples to be tested may be bonded to 0.05 mm thick polyethylene terephthlate film under a static pressure of 100 kg/cm$^2$ and the peeling apart conveniently takes place at a separation rate of 13.5 cm/minute. Peel bond values referred to hereinbelow were obtained using that method.

The following Examples will serve to illustrate the invention. There are first described a number of ink and adhesive formulations and there are then described a number of combination materials made using those inks and adhesives. All temperatures given are in degrees Celsius and all parts by weight. The abbreviation NAMW is used for number average molecular weight and VAMW for viscosity average molecular weight.

| Adhesive 1 | | |
|---|---|---|
| Polyisobutylene (NAMW 820) | 18.4 | parts |
| Polyisobutylene (VAMW 380,000) | 12.1 | parts |
| Polyethyleneglycol wax (NAMW 950 to 1050; melting point 37° to 40° C.) | 6.5 | parts |
| Oleophilic grade finely dispersed silica | 11.9 | parts |
| Aliphatic hydrocarbon solvent (boiling range 144° to 160° C.) | 144 | parts |
| Oxitol | 25 | parts |

| Adhesive 2 | | |
|---|---|---|
| Polyisobutylvinyl ether (low molecular weight) | 32.0 | parts |
| Polyterpene resin (softening point 125° C.) | 2.0 | parts |
| Oleophilic grade finely dispersed silica | 8.0 | parts |
| Oleamide wax | 10.0 | parts |
| Aliphatic hydrocarbon solvent (as in Adhesive 1) | 148.0 | parts |
| Oxitol | 10 | parts |

| Adhesive 3 | | |
|---|---|---|
| Polyisobutylene (NAMW 820) | 18.4 | parts |
| Polyisobutylene (VAMW 380,000) | 12.1 | parts |
| Oleophilic grade silica | 11.9 | parts |
| Aliphatic hydrocarbon solvent (boiling range 160°-172° C.) | 144 | parts |
| 74 O.P. industrial methylated spirit | 25 | parts |
| Cetyl alcohol | 13 | parts |

| Adhesives 4 to 9 | | |
|---|---|---|
| The basic dry transfer formulation for all of these adhesives consisted of the following ingredients: | | |
| Polybutene (NAMW 0400) | 6.9 | parts |
| Polyisobutylene (VAMW 380,000) | 3.2 | parts |
| Polyethylene wax (NAMW 2000, melting point 104° to 108°) | 4.9 | parts |
| Oleophilic grade silica | 4.0 | parts |
| Aliphatic hydrocarbon solvent (as in Example 1) | 71.0 | parts |
| Oxitol | 9.0 | parts |

Adhesive 4 contained in addition 1.0 part of polyethylene glycol wax as in Example 1.

Adhesive 5 contained in addition 1.5 parts of oleamide.

Adhesive 6 contained in addition 1.0 part of the primary amine of hydrogenated tallow acid.

Adhesive 7 contained in addition 1.0 parts of glycerol monostearate.

Adhesive 8 contained in addition 1.0 parts of a quaternary ammonium salt wax (Cyastat LS, ex Cyanamid)

Adhesive 9 contained in addition 1.0 parts of a coconut isopropanolamide.

| Adhesive 10 | |
|---|---|
| An adhesive was made up of | |
| Flexowax C | 95 parts |
| Oleamide | 5 parts |

dissolved in an aliphatic hydrocarbon solvent (as in Adhesive 1) with a small quantity of oxitol added.

| Adhesive 11 | | |
|---|---|---|
| Poly(vinyl isobutyl ether), Low molecular weight (Lutonal J30 ex BASF) | 10.8 | parts |
| Poly(vinyl isobutyl ether), High molecular weight (Lutonal ICK 106 ex BASF) | 5.7 | parts |
| Silica (Aerosil 130V ex Degussa) | 6.7 | parts |
| Ditertiarybutylhydroquinone (antioxidant) | 0.1 | parts |
| Oleamide (Crodamide OR ex Croda Chemicals) | 6.4 | parts |
| Polyethylene wax (as in adhesives 4 to 9) | 9.0 | parts |
| Aliphatic hydrocarbon solvent (as in Example 1) | 123.5 | parts |
| Xylene | 13.2 | parts |
| Oxitol | 24.9 | parts |

The adhesive may be made up by any convenient method. The preferred method for most of the above adhesives is to form a solution of the tacky resins used in the solvents given, and thereafter add the remaining ingredients. In order to ensure good dispersion, especially of the silica if used, mixing is preferably carried out using some type of high speed stirrer, e.g. a vortex type blender. In some cases the waxes used are only partly soluble in the solvents used. In such cases, it is usually desirable to form a homogeneous solution/dispersion with heating, whereafter the hot solution is cooled so as to give, when cool, a dispersion of fine wax particles in the adhesive mixture.

Ink 1

The following components were mixed together and subsequently triple roll milled to Hegman gauge 7:

| | | |
|---|---|---|
| Graphite | 3.51 | parts |
| Carbon black | 3.96 | parts |
| Nitrocellulose solution (33.3% solids in oxitol acetate grade DHX3 ex ICI Ltd). | 14.02 | parts |
| Sebacic acid alkyd | 17.62 | parts |
| Dimethylcyclohexyl phthalate | 2.14 | parts |
| Thereafter there were added | | |
| Nitrocellulose solution (as above) | 52.34 | parts |
| Oxitol acetate | 7.41 | parts |

and the ink was milled to homogeneity. The viscosity of the ink was then reduced to 55 poise (at 25° C.) with oxitol acetate.

Ink 2

The following components were mixed together and subsequently dispersed on a triple roll mill to Hegman gauge 7:

| | |
|---|---|
| Carbon black | 7.50 parts |
| Linear polyester containing hydroxyl groups (Desmophen 1652 ex Bayer UK Ltd.) | 21.30 parts |
| Nitrocellulose solution (33.3% solids in oxitol acetate grade DHX3 ex ICI Ltd) | 50.30 |
| Alkyl substituted acid amide in the form of a gel in solvents (Dehysol ex Henkel and Cie GmbH) | 2.10 parts |
| Poly-2-ethyl hexyl acrylate 50% by weight in oxitol acetate | 1.00 parts |
| Oxitol acetate | 1.00 parts |

In order to use this ink it was milled to homogeneity immediately prior to use for 16.7 parts of a polyfunctional aromatic isocyanate prepolymer (67% in ethylglycol acetate/xylene 1:1, Desmodur L67 ex Bayer). This ink should be dried at 75° C. for 25 to 30 seconds after printing and aged for 1 day before the application of adhesive thereover.

Ink 3

The following components were mixed and then dispersed on a triple roll mill to Hegman gauge 7:

| | |
|---|---|
| Titanium dioxide | 51 parts |
| Linear polyester containing hydroxyl groups (Desmophen 1652 ex Bayer UK Ltd) | 10 parts |
| Linear polyester containing hydroxyl groups high branching (Desmophen 800/85 ex Bayer UK Ltd) | 12 parts |
| Poly-2-ethylhexyl acrylate | 1 part |
| Alkyl substituted acid amide in the form of a gel in solvents (Dehysol - ex Henkel and Cie GmbH) | 1 part |
| Oxitol acetate | 7 parts |

When desired to print, there were added to this ink 18 parts of a polyfunctional aromatic isocyanate prepolymer (as in ink 2) and the ink milled to homogeneity. Using this ink, prints should be air dried at room temperature for 2 days prior to the application of adhesive.

Ink 4

The following components were mixed and dispersed on a triple roll mill to homogeneity and Hegman gauge 7 degree of fineness:

| | |
|---|---|
| Red pigment, Rubine toner B | 16.26 parts |
| Hydrophilic grade silica (Aerosil 300 ex Degussa) | 2.44 parts |
| Polyamide resin (Versamid 735 ex Cray Valley Products Ltd) | 16.26 parts |
| Polyamide resin (Versamid 725 ex Cray Valley Products Ltd) | 13.01 parts |
| Methylisobutylcarbinol | 19.52 parts |
| Amyl alcohol | 9.76 parts |
| Dioxitol | 9.76 parts |
| Oxitol | 13.01 parts |

Ink 5

The following components were mixed and triple roll milled to Hegman gauge 7:

| | |
|---|---|
| Blue pigment (Ergalite Blue BGL) | 12.00 parts |
| Hydrogenated methyl ester of rosin (Hercolyn D ex Hercules Powder Co.) | 2.84 parts |
| Epoxy ester (Estabex 2386 ex Interstab Ltd) | 0.77 parts |
| White spirit | 13.52 parts |
| n-butanol | 6.04 parts |
| Methylisobutylcarbinol | 10.55 parts |
| Ethylhydroxyethyl cellulose | 6.27 parts |

To the mixture there were then added the following ingredients in the proportions given:

| | |
|---|---|
| Hydrogenated methyl ester of rosin (Hercolyn D ex Hercules Powder Co) | 3.41 parts |
| Epoxy ester (Estabex 2386 ex Interstab Ltd) | 0.92 parts |
| White spirit | 16.22 parts |
| n-butanol | 7.25 parts |
| Methyl isobutylcarbinol | 12.66 parts |
| Ethylhydroxyethyl cellulose | 7.53 parts |

and the ink milled to homogeneity.

Ink 6

The following components were mixed to homogeneity and milled to Hegman gauge 7 in the proportions given:

| | |
|---|---|
| Rigid, amine accelerated, unsaturated polyester resin (Polymaster 2580 ex W.A. Mitchell & Smith Ltd) | 73.22 parts |
| Calcium carbonate - finely divided (Omya BLH ex Plastichem Ltd) | 24.20 parts |
| Hydrophilic grade, finely dispersed silica (Aerosil 300 ex Degussa) | 0.59 parts |
| Carbon black | 0.05 parts |

Prior to use, 1.96 parts of benzoyl peroxide (25% in di-isobutylphthalate) were added to the mixture and stirred in immediately before printing. Ink prints made using this ink should be dried at room temperature for 2 days prior to the application of adhesive.

Ink 7

The following components were mixed and stirred to homogeneity and to Hegman gauge 7 degree of fineness:

| | |
|---|---|
| Medium viscosity epoxy resin (Eurepox 730 ex Schering AG) | 45.45 parts |
| Alkyl substituted acid amide in form of a gel in high aromatic solvents (Dehysol wax ex Henkel and Cie GmbH) | 0.91 parts |
| Yellow pigment | 3.64 parts |

When this ink was required to be printed, there were added:

| | |
|---|---|
| Modified polyaminoimidazoline curing agent (Euredur 460 ex Schering AG) | 45.45 parts |
| Oxitol acetate | 4.55 parts |

This ink should be dried at room temperature for 2 days before the application of adhesive.

Ink 8

This was a commercially available ink identified as "Screen Decalon Varnish YY1" ex Coates Inks. This ink could be used as a colourless carrier film and screen printed areas of this ink could be overprinted e.g. by letterpress, lithographic or gravure printing to give releasable indicia on a carrier sheet.

Various ink, adhesive and carrier sheet combinations were then tested using the inks and adhesives exemplified above and using a variety of carrier sheets. The components of the particular transfer materials together with the peel bonds in inked and uninked areas from the adhesive surface are tabulated in the following table:

TABLE

| Base sheet | Ink No. | Adhesive No. | Tack on indicia (peel bond gm) | Tack between indicia (peel bond gm) |
|---|---|---|---|---|
| Polyethylene terephthalate .05 mm | 1 | 5 | 36 | 3 |
| " | 3 | 5 | 6 | 1 |
| " | 4 | 5 | 59 | 1 |
| " | 5 | 5 | 6 | 1 |
| " | 6 | 5 | 47 | 3 |
| " | 7 | 5 | 12 | 3 |
| " | 8 | 5 | 52 | 3 |
| " | 1 | 5 | 42 | 1 |
| " | 1 | 4 | 43 | 33 |
| " | 1 | 11 | 17 | 2 |
| " | 1 | 8 | 21 | 12 |
| " | 1 | 9 | 37 | 14 |
| " | 1 | 10 | 11 | 5 |
| " | 1 | 5 but without oleamide | 28 | 27 |

It is evident from the peel bond figures given in this table that the incorporation of a detackifying polar way in the adhesive acts to promote a substantial tack difference in the adhesive between image and non-image areas.

The words AEROSIL, CYASTAT, LUTONAL, CRODAMIDE, DESMOPHEN, DEHYSOL, VERSAMID, ERGALITE, HERCOLYN, ESTABEX, EUREPOX and EUREDUR used herein are Registered Trade Marks.

We claim:

1. In a dry transfer material consisting essentially of a flexible light transmitting carrier sheet, a plurality of transferable indicia on the carrier sheet and a coating of adhesive substance on the indicia and overlapping on to the surface of the carrier sheet, the improvement wherein the adhesive substance contains dry transfer adhesive components and a detackifying wax containing polar groups prior to being deposited on said indicia and said adhesive is deposited on to said indicia and overlapping on to said carrier sheet from a solution or dispersion in at least one organic solvent the concentration of the wax and the nature of the indicia being such that on the deposition of the adhesive composition from the solution or dispersion in at least one organic solvent and drying down of the adhesive by the evaporation thereof an interaction occurs between the adhesive and the indicia whereby the surface tack of the adhesive over the indicia is greater than the surface tack of the adhesive on the carrier between the indicia.

2. The dry transfer material of claim 1 wherein the proportion of wax containing polar groups in the adhesive solids is 2 to 1.2% by weight.

3. The dry transfer material of claim 1 wherein the indicia are based on a cellulose film-forming material and are formed by printing from a printing ink.

4. The dry transfer material of claim 1 wherein the carrier sheet consists of a film selected from the class consisting of polyethylene, polystyrenebutadiene and polyethylene terephthalate films.

5. The dry transfer material of claim 1 wherein the detackifying wax is a polyethylene glycol wax.

6. The dry transfer material of claim 1 wherein the adhesive has been deposited from a mixed solvent system comprising a polar solvent and a non-polar solvent.

7. The dry transfer material of claim 1 wherein the dry transfer adhesive components comprise a tacky polymeric component and at least one tack reducing component selected from the group consisting of a finely divided mineral material and a non-polar synthetic hydrocarbon wax.

8. The dry transfer material of claim 7 wherein the tack reducing component is finely divided silica.

9. The dry transfer material of claim 7 wherein the tack reducing component is a non-polar wax.

10. A dry transfer material consisting essentially of;

a flexible light transmitting carrier sheet;

a plurality of transferable indicia on said carrier sheet;

a coating of adhesive on said indicia and overlapping onto the surface of the carrier sheet;

said adhesive comprising dry transfer adhesive components and a detackifying wax containing polar groups, said adhesive containing said detackifying wax and said adhesive components being deposited on said carrier from a solution or a dispersion in at least one organic solvent and allowed to dry whereby the surface tack of the adhesive layer in the area over the indicia is greater than the surface tack of the adhesive in the area of the carrier between the indicia.

11. A dry transfer material comprising;

a flexible light transmitting carrier sheet;

a plurality of transferable indicia printed directly on said carrier sheet;

a single layer of an adhesive material extending over said indicia and the carrier sheet in the areas between the indicia, said adhesive comprising dry transfer adhesive components and a detackifying wax containing polar groups, said adhesive containing said detackifying wax and said dry transfer adhesive components being deposited on said carrier sheet from a solution or a dispersion including at least one organic solvent, the surface of said indicia having a relatively higher polarity than the surface of said carrier sheet, and the surface tack after drying of said adhesive material over said indicia is greater than the surface tack after drying of said adhesive material on said carrier sheet in the spaces between the indicia.

12. In a dry transfer material consisting essentially of a flexible light transmitting carrier sheet, a plurality of transferable indicia on the carrier sheet and a coating of adhesive substance on the indicia and overlapping onto the surface of the carrier sheet, the improvement wherein the adhesive coating has been deposited from a solution or dispersion in at least one organic solvent and contains in addition to dry transfer adhesive components a fatty acid amide wax, the concentration of the wax and the nature of the indicia being such that on the deposition of the adhesive composition from the solution or dispersion in at least one organic solvent and drying down of the adhesive by the evaporation thereof an interaction has taken place between the adhesive and the indicia whereby the surface tack of the adhesive over the indicia is greater than the surface tack of the adhesive on the carrier between the indicia.

13. A dry transfer material consisting essentially of a flexible light transmitting carrier sheet, a plurality of spaced apart transferable indicia on the carrier sheet and a coating of an adhesive substance containing dry transfer adhesive components and a detackifying wax containing polar groups over the indicia and overlapping onto the surface of the carrier sheet, the surface of said indicia having a relatively higher polarity than the surface of said carrier sheet, said material being prepared by depositing said adhesive from a solution or dispersion in at least one organic solvent onto said carrier and over said indicia, said adhesive containing a sufficient quantity of said detackifying wax containing polar groups for interacting with said indicia and said carrier, and drying the adhesive by evaporation thereof whereby the surface tack of the dried adhesive substance in the area over the indicia is greater than the surface tack of the dried adhesive substance in the area of the carrier of the indicia between the indicia.

* * * * *

UNITED STATES PATENT AND TRADEMARK OFFICE

CERTIFICATE OF CORRECTION

PATENT NO. : 4,177,309

DATED : December 4, 1979

INVENTOR(S) : Philip Shadbolt; Helen Ganszczyk

It is certified that error appears in the above-identified patent and that said Letters Patent are hereby corrected as shown below:

In Claim 2 (Column 9, last line), change "1.2%" to "12%".

Signed and Sealed this

*Seventeenth* Day of *June 1980*

[SEAL]

*Attest:*

SIDNEY A. DIAMOND

*Attesting Officer* *Commissioner of Patents and Trademarks*